(12) United States Patent
Littlefield et al.

(10) Patent No.: US 7,162,075 B2
(45) Date of Patent: Jan. 9, 2007

(54) THREE-DIMENSIONAL IMAGE CAPTURE SYSTEM

(75) Inventors: Timothy R. Littlefield, Goodyear, AZ (US); Jeanne K. Pomatto, Scottsdale, AZ (US)

(73) Assignee: Cranial Technologies, Inc., Tempe, AZ (US)

( * ) Notice: Subject to any disclaimer, the term of this patent is extended or adjusted under 35 U.S.C. 154(b) by 835 days.

(21) Appl. No.: 10/385,307

(22) Filed: Mar. 10, 2003

(65) Prior Publication Data

US 2004/0179728 A1 Sep. 16, 2004

(51) Int. Cl.
*G06K 9/00* (2006.01)

(52) U.S. Cl. ..................... 382/154; 382/128

(58) Field of Classification Search ............... 382/125, 382/154; 345/419–420; 348/47–48
See application file for complete search history.

(56) References Cited

U.S. PATENT DOCUMENTS

| | | | |
|---|---|---|---|
| 6,567,116 B1 * | 5/2003 | Aman et al. | 348/169 |
| 6,572,572 B1 * | 6/2003 | Pomatto et al. | 602/17 |
| 6,754,370 B1 * | 6/2004 | Hall-Holt et al. | 382/106 |
| 6,792,140 B1 * | 9/2004 | Matusik et al. | 382/154 |
| 6,914,599 B1 * | 7/2005 | Rowe et al. | 345/420 |
| 6,950,123 B1 * | 9/2005 | Martins | 348/157 |
| 2003/0169917 A1 * | 9/2003 | Ishiyama | 382/154 |

OTHER PUBLICATIONS

CYBERWARE,From Whole Body Scan . . . 3D Development, Spring 1998, pp. 1,2,6, Issue 10, USA.
J.E. Stevens, high Tech Healing for Burn Patients, Computer Graphincs World, Jul. 1998, pp. 23-24, USA.
CYBERWARE,Motion Platforms Models MS and PS, brochure, Jan. 1992, USA.
CYBERWARE, Rapid 3D Color Digitizer Model 3030, Aug. 1992, brochure, USA.
CYBERWARE, Reshape the Way You Edit 3D Models, undated brochure, USA.
CYBERWARE, Building a Better Workplace . . . , 3D Development, p. 1, Issue 8, Winter 1996, USA.
EOIS, Mini-Moire Faroarm System, undated brochure.
Minolta, Vivid 700 Non-Contact 3D Digitizer, undated brochure.
Capod Systems, Capod CAD/CAM for Prostheses and Orthoses, Undated Brochure, USA.
The Turing Institute, C3D, brochure, 1996.
EYETRONICS, The ShapeMatcher v.1.0, undated brochure, Belgium.
EYETRONICS,Eyewitness, Nr. Jul. 1, 2000, Belgium.
EYETRONICS, Eyewitness, Dec. 2000, Belgium.
Wicks and Wilson Limited, Triform 3D Scanning Systems, undated brochure, England.
NEWPORT, Atos Topometric 3D-Sensor, undated brochure.
E Miller, Fast Three-Dimensional Form . . . , Optical Engineering, Sep. 1995, V 34, No. 9, pp. 2754,2755 US.

(Continued)

*Primary Examiner*—Daniel Mariam
(74) *Attorney, Agent, or Firm*—Donald J. Lenkszus

(57) ABSTRACT

An image capturing system utilizes a plurality of image capturing apparatus to capture first image data for an object. A processor is utilized to combine the first images to produce first three-dimensional digital image data. The processor then utilizes a second algorithm to combine the intermediate digital image information to produce a complete three-dimensional digital image of the object. The three-dimensional image may be viewed on a display and viewed from any point on a three dimensional surface surrounding the object. The object can be non-stationary.

44 Claims, 8 Drawing Sheets

OTHER PUBLICATIONS

J-F Lin et al, Two-dimensional Fourier . . . , Optical Engineering, Nov. 1995, V 34, No. 11, pp. 3297, 3299, USA.

T. Matsumoto et al, Sensitivity-variable Moire . . . , Opt. Engineering, Jun. 1996, V 35, No. 6, pp. 1754-1760, USA.

P. Tatasciore, Projection Moire . . . , Opt Engineering, Jul. 1995, V 34, No. 7, pp. 1887-1899, USA.

D. B. M. Cetica, High-resolution Optical . . . , Opt. Engineering, Apr. 1995, V34 No. 4, 1219-1225, USA.

Ew-C Tai, Noncontact Profilometric Measurement . . . , Opt. Engineering, Sep. 1996, pp. 2730-2735,V35, No. 9, US.

T. Nouri, Three-Dimensional Scanner . . . , Opt. Engineering, Jul. 1995, pp. 1961-1963,V34,No. 7, USA.

M. Vannier et al, Facial Surface Scanner, IEEE Computer Graphics & App, Nov. 1991, pp. 72-80, US.

J. Yoon et al, Mathematical Description of Facial Profiles, Automedica, 1992, pp. 311-318, V14.

GEOMETRIX, Inc., 3-Scan, Brochure, copyrighted 1998-1999.

M. Vanier, Cencit Report, Apr. 1995, Mallincrodt Institute of Radiology,USA.

P. Kim et al, Measuring the Thermal Expansion . . . , Proceedings, ICCM-10, Aug. 1995, V. 1v, Canada.

M. Vannier et al, Medical Facial Scanner, Image VI Conference, pp. 295-299, Jul. 14, 1992 USA.

M. Vannier et al, Quantitative .Three-Dimensional . . . , Little, Brown, and Co., 1993, USA.

G. Bhatia et al, A ractical Surface Patch Registration . . . , SPIE, pp. 135-145, V 2355, 1994, USA.

P.K. Commean, Geometric Design of a Multisensor Structured . . . , Opt Eng, Apr. 1994, pp. 1349-1358, USA.

G Bhatia, Quantification of Facial Surface . . . , Plastic and Reconstructive Surgery, Nov. 1994, 768+, USA.

M. Demers, et al, Three Dimensional Surface Capture . . . , Electronic Imaging 97 Conf., Feb. 1997, USA.

G.M. Galdino, Three-Dimensional Digital Photography . . . , undated article.

G. Bhatia et al, Automated Lower Limb Prosthesis Design, SPIE, Oct. 1994, v. 2359, pp. 493-203, US.

G. Bhatia, Surface Imaging of the Human Body, SPIE, Oct. 1994, v. 2359, pp. 329-340, USA.

\* cited by examiner

THREE-DIMENSIONAL IMAGE CAPTURE SYSTEM

FIELD OF THE INVENTION

This invention pertains to imaging systems, in general, and to a three-dimensional imaging system for capturing three-dimensional images of an object that is not constrained from moving.

BACKGROUND OF THE INVENTION

Various systems are known for the capturing of images of objects including live objects. One category of such systems typically utilizes a scanning technology with lasers or other beam emitting sources. The difficulty with systems of this type is that to scan a three-dimensional object, the scan times limit use of the systems to stationary objects.

A second category of image captures systems utilizes triangulated cameras with or without projection of structured light patterns on the object. However, these systems typically are arranged to capture a three-dimensional image of only a portion of the object. Typically such systems also are used only with stationary objects.

It is highly desirable to provide an image capturing system that will capture three-dimensional images of objects that are not stationary, but which may move. It is also desirable that the three-dimensional image has high resolution and high accuracy. It is particularly desirable that the three-dimensional image captures the totality of the object.

It is particularly desirable to provide an image capturing system that will have the ability to capture an accurate three-dimensional image of an infant's head. Capturing of such an image has not been possible with prior image capturing systems for a variety of reasons, one of which being that infants are not stationary for the times that prior systems require to scan or capture the data necessary to produce a three-dimensional image. Another reason is that prior systems could only acquire a partial three-dimensional imager portion. The need for such a system is for producing cranial remodeling bands is great.

Treatment of infants with deformational plagiocephaly with cranial remodeling bands has become a standard of care in the United States. The process by which a cranial remodeling band is fabricated requires obtaining a negative or 'cast' impression of the child's head. This is accomplished by first pulling a cotton stockinet over the child's head, and then casting the head with quick setting, low temperature plaster splints.

The casting technique takes approximately 7 to 10 minutes. After the initial casting, a plaster model of the infant's head is made and is used for the fabrication of the cranial remodeling band.

It is highly desirable to simplify the process by utilizing digitization techniques to produce useful digital three-dimensional images of the entire head. We undertook an exhaustive search to identify and evaluate different digitization techniques. Numerous laser scanning, structured light, Moire, and triangulated CCD camera systems were evaluated and rejected as inadequate for one reason or another.

Prior digitization techniques and systems fail to recognize the particular unique challenges and requirements necessary for a system for the digitization of infants. The infant patients to be digitized range in age from three to eighteen months of age. The younger infants are not able to follow verbal instructions and are not able to demonstrate head control while the older infants are difficult to control to more than a brief moment of time. A wide variety of head configurations, skin tone, and hair configurations also needed to be captured. A digitization system must acquire the image in a fraction of a second so that the child would not need to be restrained during image capture, and so that movement during image acquisition would not affect the data. The system data capture must be repeatable, accurate and safe for regular repeated use. In addition, to be used in a clinical setting the system had to be robust, easy to use, and easy to calibrate and maintain without the need for hiring additional technical staff to run the equipment. Image acquisition, processing, and viewing of the data had to be performed in real time in order to ensure that no data was missing before allowing the patient to leave the office.

Numerous existing digitization techniques were evaluated. Laser scanning methods have the disadvantage of the long time, typically 14–20 seconds, that is required to scan an object. Because of the long time, an infant being scanned would have to be restrained in a specific orientation for the scan time. Recent advances in laser scanning have produced scan systems that can perform a scan in 1–2 seconds. However even this scan rate is too slow for an unrestrained infant. The use of lasers also raises concerns regarding their appropriateness and safety for use with an infant population. While many prior digitization systems use 'eye safe' lasers, the use of protective goggles is still frequently recommended.

Structured-light Moire and phase-shifted Moire systems used in certain 3D imaging systems are difficult to calibrate, are costly, and are relatively slow and therefore are not suitable for use in obtaining images of infants. In addition these systems are incapable of capturing the entirety of an object in one time instant.

Computed Tomography (CT) and Magnetic Resonance Imaging (MRI) are not particularly useful for the present application simply due to size, expense and concerns regarding radiation and the need to anesthetize the infant.

Prior systems that rely solely on triangulation of digital cameras proved to have insufficient accuracies, particularly as the object being imaged varied in shape and size from a calibration standard.

Structured light systems that combined triangulated digital cameras with a projected grid or line pattern can capture only one surface at a time because the grids projected by multiple projectors interfered with each other resulting in a loss of data. In addition, the images captured by this structured light systems need to be fit together like a three-dimensional jigsaw puzzle, and required that markers be placed on the subject in order to facilitate this registration process.

SUMMARY OF THE INVENTION

We have developed a new image capturing system that captures accurate three-dimensional images of objects that is configured such that the object having its image captured does not have to be stationary or fixed in one particular orientation. The system of the invention will capture a three-dimensional digitized image of the entirety of an object even though the object may move in a generally non-predetermined manner within a predetermined space. A sequence of instantaneous three-dimensional images may be captured to provide a movie of the object as it moves.

A method for capturing three-dimensional images of object in accordance with the invention includes the step of providing a plurality of image capturing device groups. Each group comprises a plurality of image capturing devices. The method includes positioning the image capturing devices to define a space wherein an object may be disposed. In accordance with one aspect of the invention, the object is movable within the space. The method further includes positioning the image capturing device groups such that each group is positioned to capture a group of first images of a corresponding surface portion of the object. Each group of first images captures a substantially different surface portion of the object disposed within the space. The method includes operating the plurality of image capturing device groups to capture first images of the object in the space, such that a plurality of the groups of first images includes the entirety of the object within the space. The method also includes providing processing apparatus to process the plurality of groups of first images to provide a three-dimensional image of the entirety of the object within the space.

In accordance with one aspect of the invention, the method includes simultaneously operating all of said image capturing devices of all of said image capturing device groups to capture a plurality of said groups of first images. The image capturing devices are operated at an image capture speed selected to be fast enough such that motion of the object has no significant effect on each of said first images.

In accordance with another aspect of the method of the invention, processing apparatus is used in accordance with a first algorithm to process each group of first images to produce an intermediate three-dimensional image representation of the corresponding object portion, whereby the processing apparatus processes all of plurality of groups of first images to produce a plurality of intermediate three-dimensional images. The plurality of three-dimensional images covers the entirety of the object in the space.

Still in furtherance with the invention the processing apparatus is used in accordance with a second algorithm to process the plurality of intermediate three-dimensional images to produce a three-dimensional image of the object.

In the illustrative embodiment of the invention, CCD cameras are utilized as the image capturing devices.

In accordance with another aspect of the invention the positions of the plurality of image capturing devices are selected in accordance with a predetermined desired accuracy in said three-dimensional image.

In accordance with yet another aspect of the invention the number of image capturing devices is selected in accordance with a predetermined accuracy in said three-dimensional image.

The image capturing devices are operated at an image capture speed selected to be fast enough such that motion of the object has no significant effect on each of the first images, whereby, the capture speed is fast enough to provide stop-action image capture of the object.

The system that we have developed is particularly useful as a three-dimensional (3D) image capture system to replace the manual casting technique currently employed. The three-dimensional (3D) imaging system obtains a digital image of an infant's head. A system in accordance with the principles of the invention provides a safe and noninvasive method of instantaneously obtaining a complete 3D model of an infant's head. The imaging system is fast (<1 second), safe, accurate, repeatable, quiet, captures an image for all skin tones, is impervious to motion, and does not require the child to be restrained in a specific orientation. In contrast to the prior plaster casting methods, that typically would not cast the face of the infant, the system of the invention permits full three-dimensional capture of the entirety of the infant's head including the face.

One embodiment of the system uses 18 triangulated digital cameras and projects a random infrared pattern onto the infant's head to instantaneously capture a 360° image of the infant's cranium including the face and the top of the head. The image is acquired in 0.008 seconds and processed for viewing in software in less than. Accuracy was calculated to be +/−0.236 mm. Hazard analysis confirmed the system to be safe for direct continuous exposure. The data acquired is viewable on a display or printed out as a point cloud, wire frame, or surface, on which a digital photograph (i.e. texture) is automatically overlaid. A texture overlay of the infant may be provided. The use of a texture overlay permits advantageous visual confirmation of the identity of the patient. Exporting the digital data to a milling machine or other model producing equipment creates physical models. Quantitative data (linear and surface measurements, curvature, and volumes) can be obtained directly from the digital data.

When utilizing the system of the invention, it may be desirable to utilize a stockinet over the infant's head to compress the hair so that accurate images of the infant's head may be obtained.

One particular advantage of the system of the invention is that each three-dimensional image is stored in a memory. Sequentially taken three-dimensional images may be played back as a movie of the object in three-dimensional format that may be viewed from any position around the object.

BRIEF DESCRIPTION OF THE DRAWING

The invention will be better understood from a reading of the following detailed description of embodiments of the invention taken in conjunction with the drawing figures in which like reference designators are used to identify like elements, and in which.

DETAILED DESCRIPTION

Figure 1:
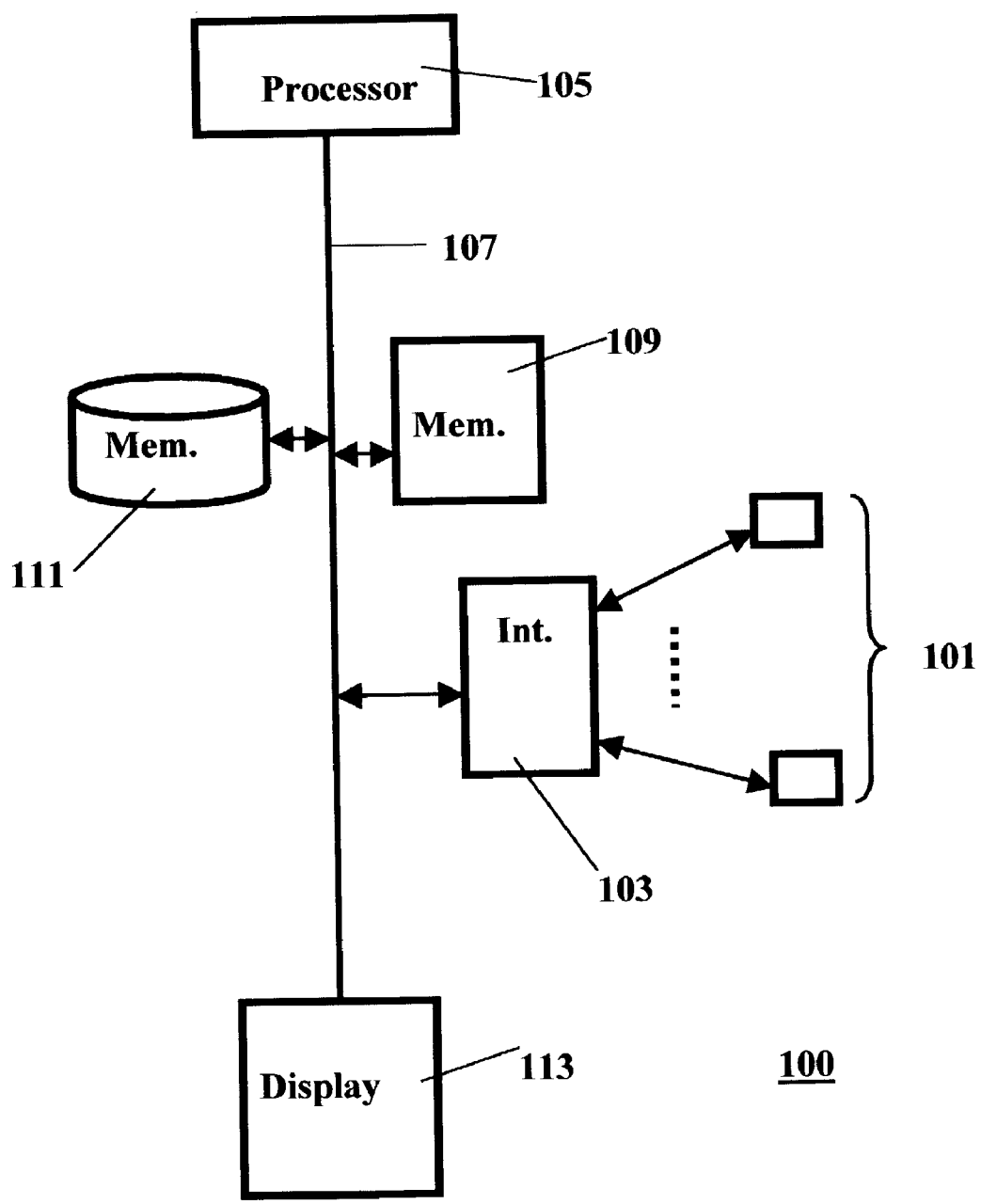
FIG. 1 is a block diagram of an image capture system in accordance with the invention.

Turning now to FIG. 1, a block diagram of an image capture system 100 is shown in block diagram form. System 100 includes a plurality of image capturing apparatus 101. Each image capturing apparatus is operable such that a three-dimensional image is captured for a surface portion of an object that is disposed within the field of view of the image capturing apparatus.

The image capturing apparatus 101 are all coupled to and controlled by processing apparatus 105 via a bus 107. In addition processing apparatus 105 has associated with it program memory 109 and data memory 111. It will be understood by those skilled in the art that processing apparatus 105 may include one or more processors that are commercially available from a wide variety of sources. The processors may utilized the Pentium 4 or Itanium type chips, both available from Intel Corporation and included in a large number of commercially available processors. Program memory 109 and data memory 111 may be the same memory, or each may comprise a plurality of memory units.

Program memory 109 includes an image-processing or second algorithm that is utilized to process digitized three-dimensional images of surface portions provided by image capturing apparatus 101 to produce a digitized image of the entirety of an object.

In operation, processor apparatus 105 controls image capture apparatus 101 such that all of image capture apparatus 101 are simultaneously operated to capture digitized first images of corresponding surface portions of an object. The digitized first images are uploaded into data memory 111 under control of processor apparatus 105.

Processor apparatus 105 operates on the digitized first images stored in memory 111 in accordance with the second algorithm stored in memory 109 to produce a composite three-dimensional digitized image from all of die first digitized images. The composite three-dimensional digital image is stored in memory 111 by processor 105. A display 113 coupled to processor apparatus 105 may be used to display the three-dimensional composite image of the object.

Figure 2:
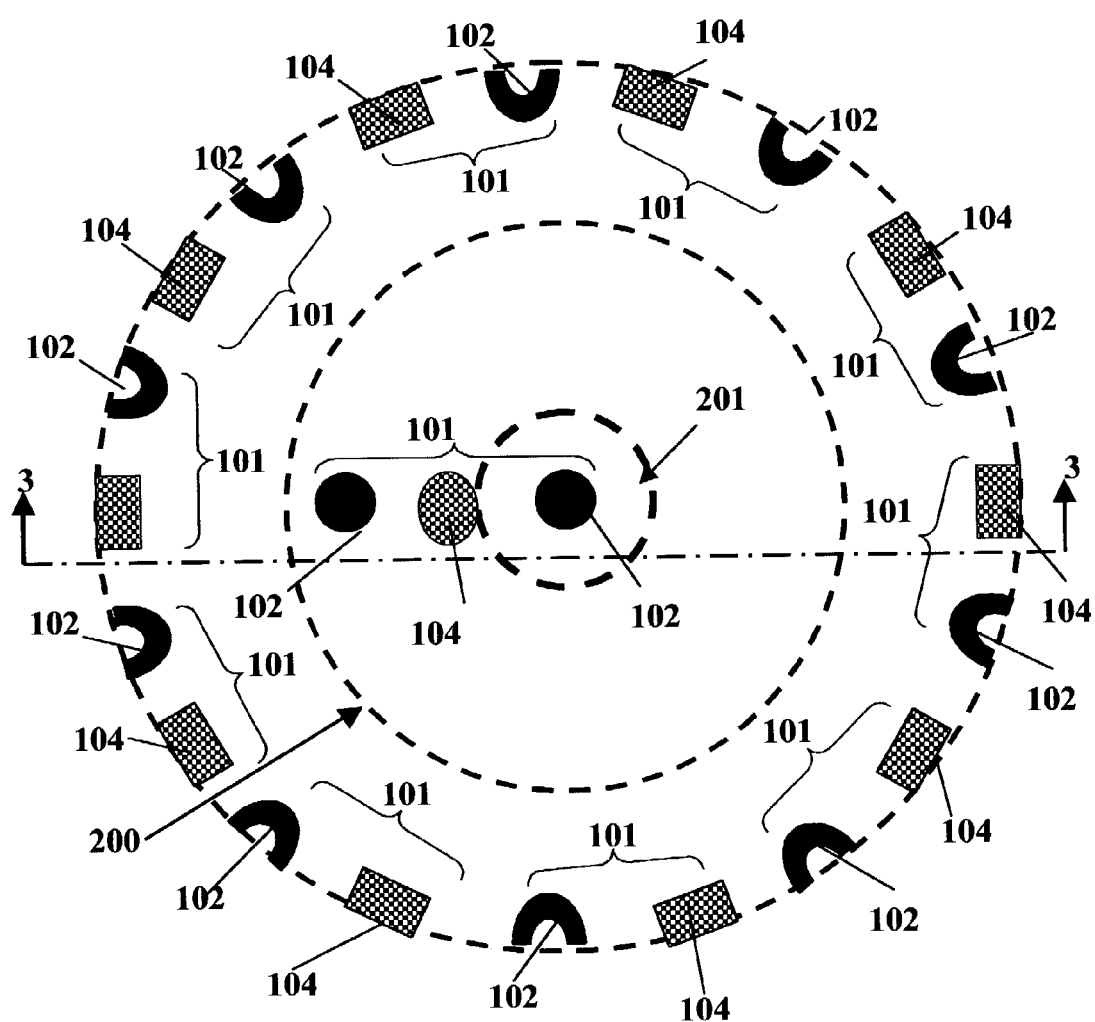
FIG. 2 is a top view of a portion of the image capture system of FIG. 1.
Figure 3:
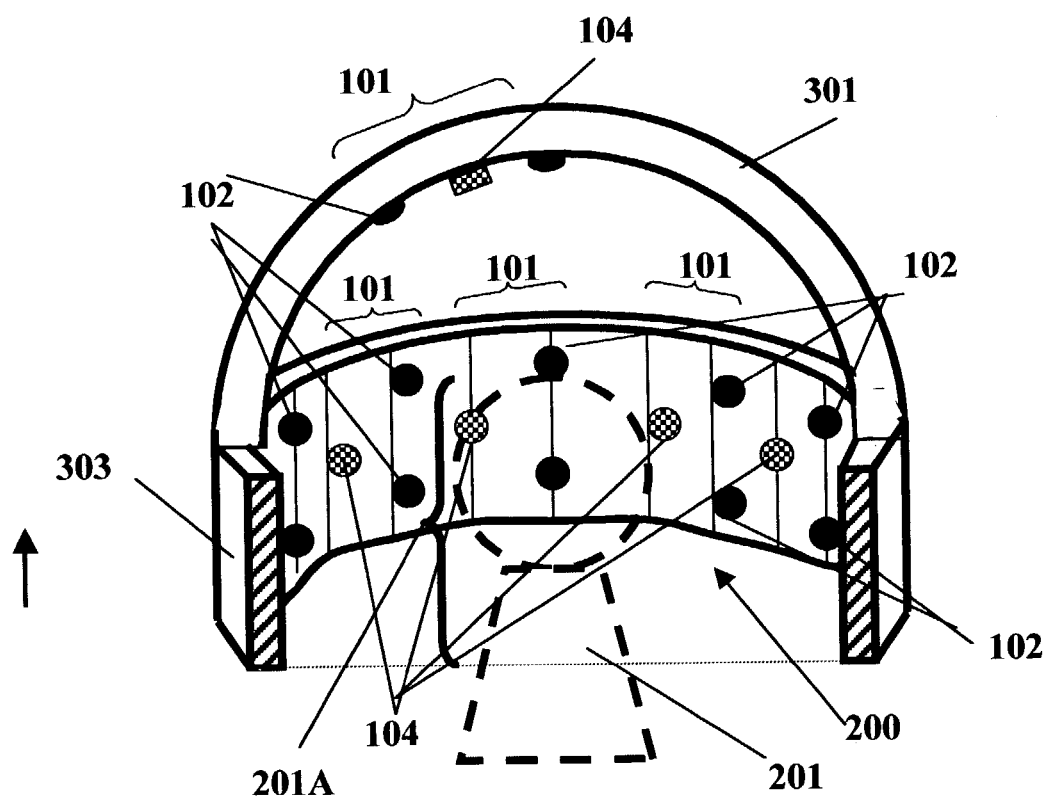
FIG. 3 is a cross-section take along lines 3—3 of the image capture system portion of FIG. 2.

The plurality of image capturing apparatus 101 are arranged to define a space 200 within which a three-dimensional image is captured of an object 201. As shown in FIGS. 2 and 3 the image capturing apparatus 101 are arranged to define a space 200 in the shape of a hemisphere. Although the illustrative embodiment defines a hemispherical shape, it will be understood by those skilled in the art that the defined space may be of a different configuration. It should also be apparent to those skilled in the art that the principles of the invention are not limited to the positioning of image capturing apparatus to any particular shape object 201. For certain objects 201, the image capturing apparatus may define a full sphere. In other implementations, the image capturing apparatus may define a space that is elongated in one or more directions. It will also be apparent to those skilled in the art that the size of the space 200 will be determined by the characteristics of the plurality of image capturing apparatus.

The number and positioning of image capturing apparatus 101 are selected to achieve a predetermined accuracy and resolution. The image capture speed of the image capturing apparatus 101 is selected to provide a "stop-action" image of the object 201. Thus, for example, conventional photographic speeds may be used to determine the top speed of an object 201 that moves within the space 200. To the extent that an object 201 extends outside of space 200, that portion 201A of object 201 that is within space 200 will be image captured such that the entirety of that portion 201A that is within space 200 will captured as a digitized three-dimensional image.

Figure 4:
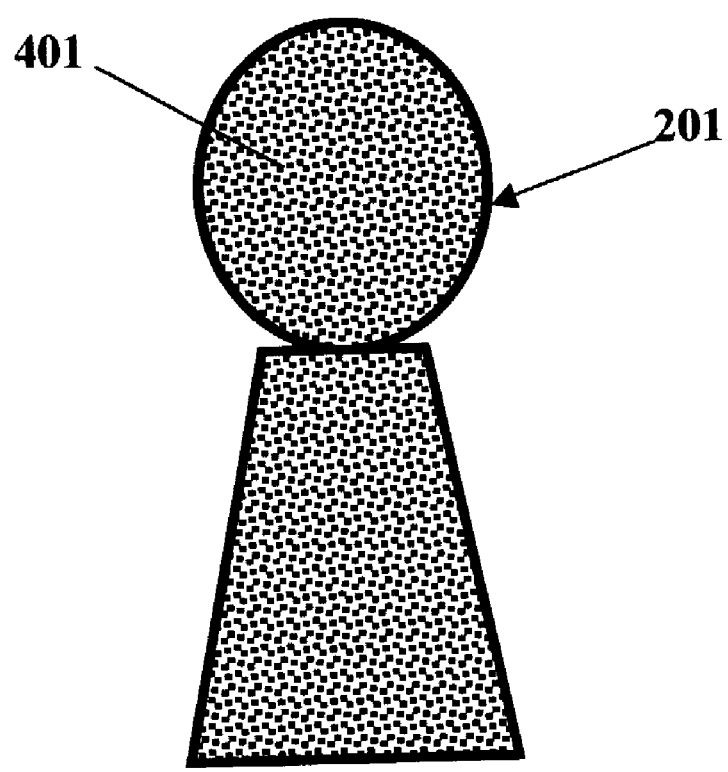
FIG. 4 is a representation of a random infrared image projected onto an object for which an image is to be captured.

In the illustrative embodiment of the invention, each image capturing apparatus 101 includes a plurality of digital cameras 102 such as CCD (charge coupled device) cameras 102 and a projector 104. Each CCD camera 102 is a high-resolution type camera of a type that is commercially available. Each projector 104 projects a pattern onto the object to facilitate processing of the images captured by the plurality of digital cameras 102 within an image capturing apparatus 101 into a three-dimensional image of a corresponding portion of the object 201. Projector 104 projects a random infrared pattern 401 as shown in FIG. 4 onto the object 201 that permits an algorithm to easily utilize triangulation to generate a digitized three-dimensional representation of the corresponding portion of object 201.

The CCD cameras 102 and projectors 104 may be supported on one or more supports such as the representative supports or support members 301, 303 shown in FIG. 3.

A particularly useful application of the system of the invention is for use in capturing three-dimensional images of the totality of an infant's head. Producing a three-dimensional image of an infant is particularly difficult because infants do not remain motionless. Furthermore the motion that an infant may make is somewhat unpredictable. The infant may move his or her head in one direction while tilting and rotating it. The motion may be smooth or it may be jerky. The infant may move his head in one direction while rotating it in the opposite direction. It therefore is important that the system operate at a speed to capture the entirety of the infant's head in one instant. To provide a system which utilizes a safe and noninvasive method of obtaining a 3D model of an infant's cranium, technological challenges had to be overcome that were not immediately evident during the initial stages of development. To be useful in a clinical setting, the system must be fast (<1s), safe, accurate, repeatable, quiet, capture all skin tones, be impervious to motion, and not require the child to be restrained in a specific orientation. To be useful, the system captures a 360° image which includes the face, top of the head, and lower occiput/neck region. A photographic image of the child is acquired and can be seamlessly overlaid on the three-dimensional display of the head to guarantee patient identification. The digital model is processed and visualized within minutes to ensure that no data are missing before allowing the patient to leave the office. Calibration and operation of the system is simple, fast, and robust enough to handle normal clinical operation.

Figure 5:
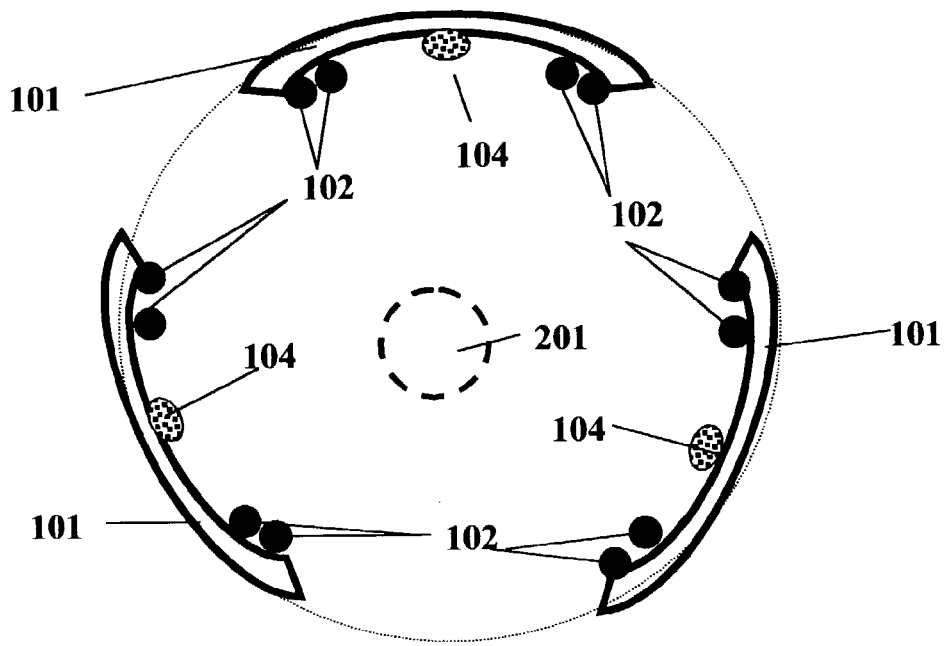
FIG. 5 is a top view of the image-capturing portion of a second embodiment of a portion of an image in accordance with the invention.
Figure 6:
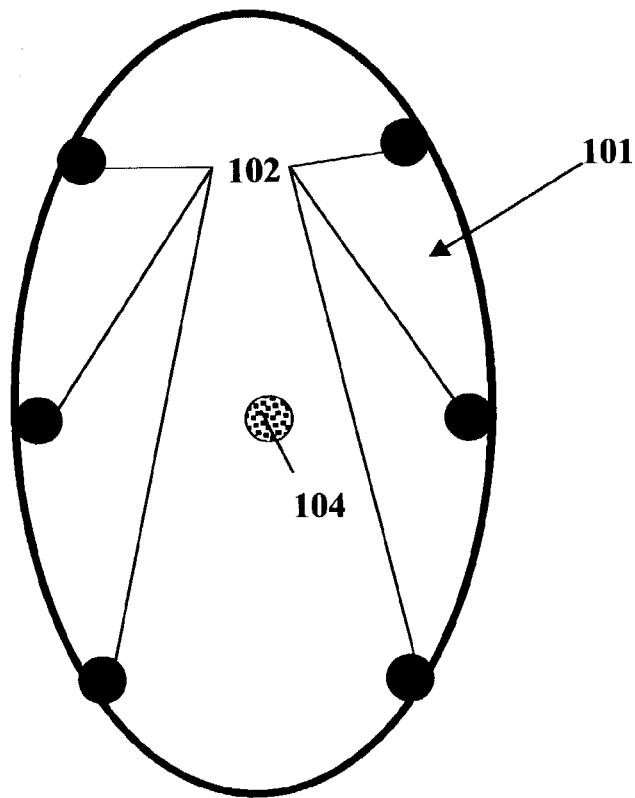
FIG. 6 is a planar view of an image-capturing module utilized in the image-capturing portion shown in FIG. 5.

Turning now to FIG. 5, one embodiment of system 100 that is particularly useful with infant head image capture comprises 18 triangulated digital cameras 102. Cameras 102 are arranged onto three supports or modules 501. Six cameras 102 are located in each module 501. Modules 501 are arranged in an equilateral triangle arrangement with each module 501 located at a vertex. Twelve of the triangulated cameras 102 are used to obtain digital image information regarding the three-dimensional shape of the infant's head 201. The remaining six cameras 102 capture digital photographs (i.e. texture data) of the child. A single projector 104 is located in each of the three modules 501, and projects a random infrared speckle pattern such as shown in FIG. 4 onto the child 201 at the moment the image is taken. This pattern cannot be seen by the operator or the child, but is visible to the 12 cameras 102 that obtain the digital shape information.

Figure 7:
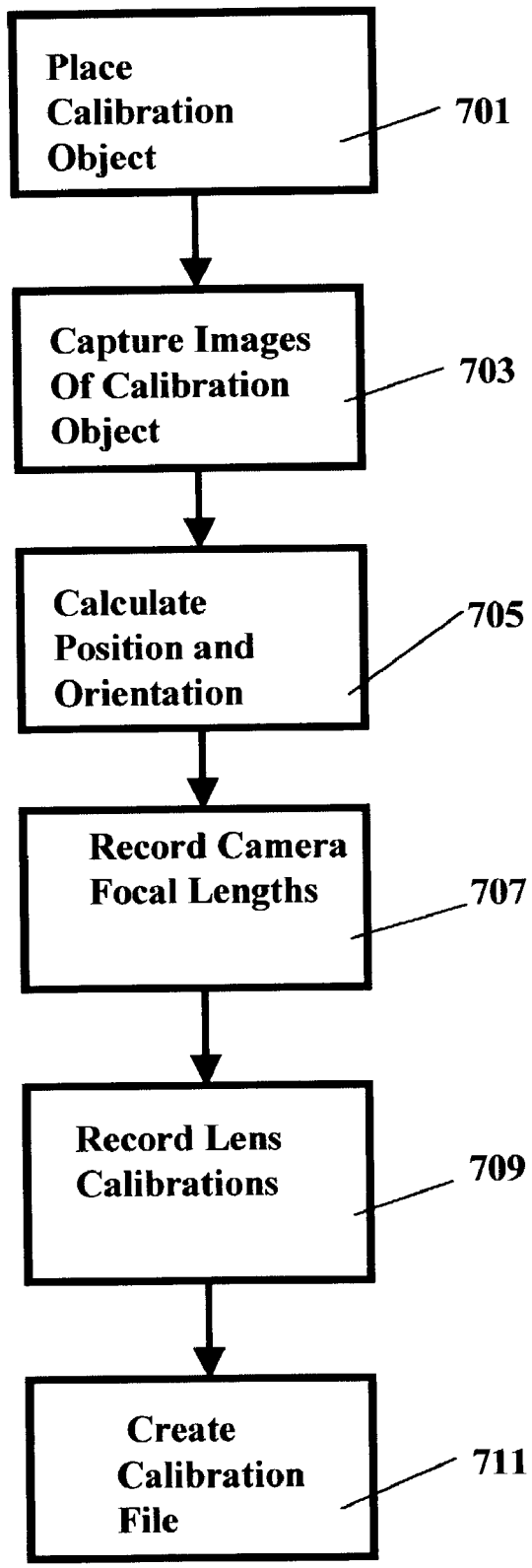
FIG. 7 is a flow diagram of a calibration operation of a system in accordance with the invention.

It is important that the system is calibrated so that the digital data accurately represents the object or infant having its image captured. Turning to FIG. 7, calibration is accomplished by placing a calibration object into the center of the system at step 701 and then operating all of cameras 102 simultaneously with projectors 104 to simultaneously capture 12 images of the object at step 703. At step 705, using the 12 images, along with information about the calibration standard itself, the precise location and orientation of each digital camera 102 with respect to one another is determined. Data regarding each of the camera's focal lengths obtained at step 707, and lens aberration information obtained at step 709 are recorded with the location and orientation data are recorded at step 711 in a calibration file. This calibration file is used later to reconstruct a 3D image of the child from 12 separate digital images.

Figure 8:
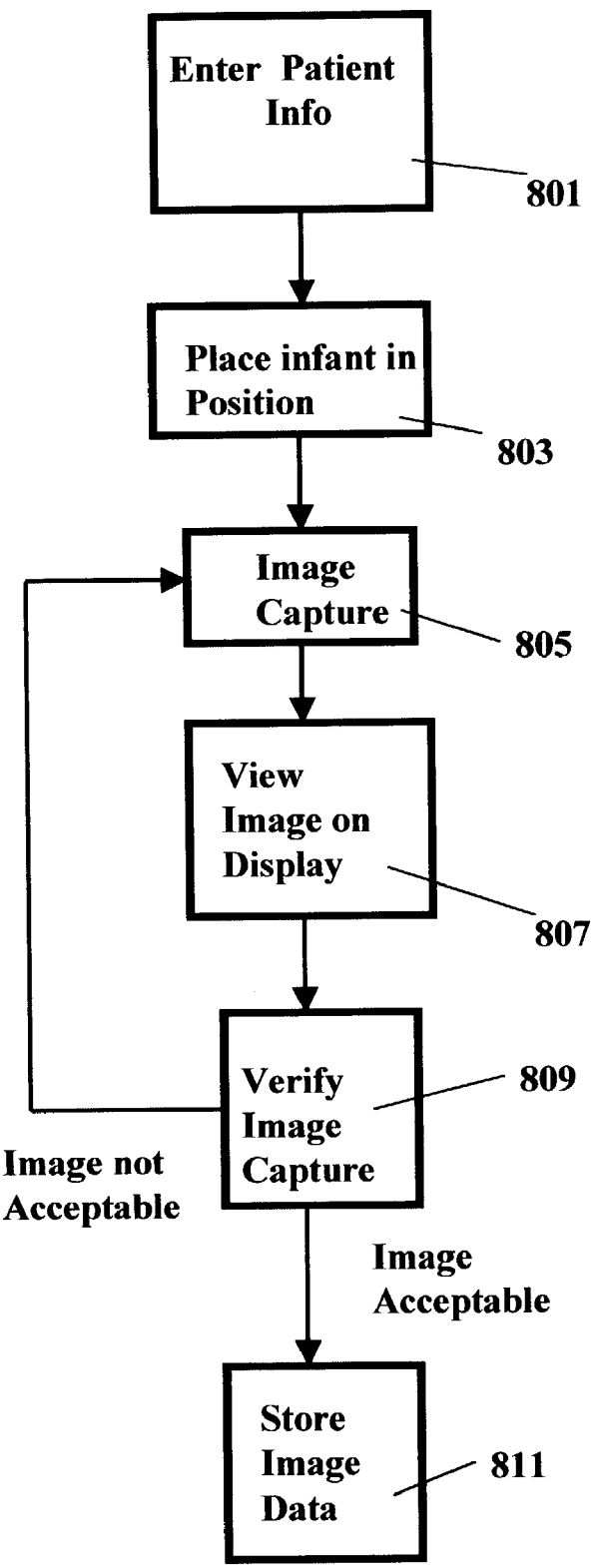
FIG. 8 is a flow diagram of operation of a system in accordance with the invention.

To acquire the infant's image, the system operator first enters the patient information into the system as indicated at step 801 of FIG. 8. The infant is placed into position as indicated at step 803. Both the child 201 and parent are located in the center of the equilateral triangle with the infant sitting on an adjustable, rotating stool. The infant 201 is supported by the parent, who may remain in the system while the child is digitized. The infant's head is not restrained and may move in motion having pivotal, rotational and translation components. When the parent and infant are in position the system operator actuates system 100 to capture and simultaneously record 18 images of the child at step 805. Within two and half minutes, images from the 12 shape cameras are reconstructed into a 360° digital model using the previously recorded calibration data. Texture data (i.e. digital photographs) are automatically overlaid on the model, although the data may be viewed with or without this information. (FIGS. 3–6) Processing the 12 images into a single model can either be done immediately following the acquisition, or several images can be acquired and processed at a later time. Preferably the image is displayed as indicted at step 807 and the image capture is verified at step 809. The image data of the obtained image is stored at step 811. If the image obtained is not acceptable, new images may be captured, displayed and viewed.

Figure 9:
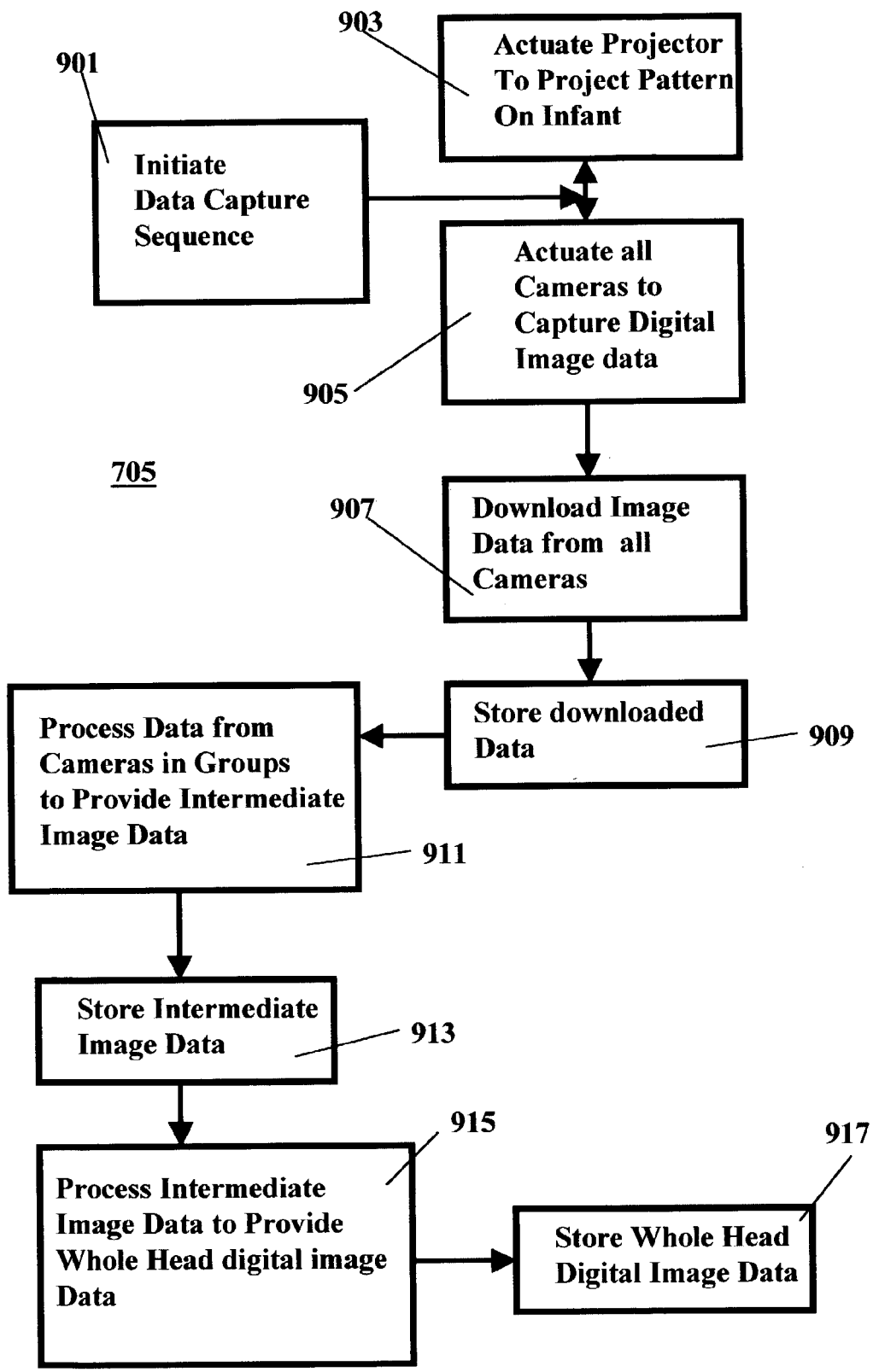
FIG. 9 is a detailed flow diagram of a portion of the flow diagram of FIG. 8.

Turning now to FIG. 9, the operation of system 100 in capturing an image is shown in a more detailed flow diagram. At step 901, image capture is initiated. Simultaneously, all projectors 104 are actuated at step 903 and all cameras 102 are operated at step 904. The resulting digital images are downloaded from all of cameras 102 to processor 105 at step 907 and stored in memory 111 at step 909. The data from cameras 102 in a triangulation pair are processed in accordance with a first algorithm in a program module from memory 109 at step 911 to produce intermediate three-dimensional digital images of corresponding portions of the object or infant's head 201. The intermediate three-dimensional digital images are stored in memory 111 at step 913. Processor 105 then processes the intermediate three-dimensional images at step 915 in accordance with a second algorithm in a program module from memory 109 to produce a complete three-dimensional digital image file for the whole or entire object that is within space 200 or the infant's whole or entire head 201 within space 200. Processor 105 stores the entire three-dimensional image file in memory 111 for later use.

Accuracy is often reported as a 'mean' or 'average' difference between the surfaces, however in this situation reporting an average is inaccurate because the surface created from the new data set may have components that lay both above (+) and below (−) the reference surface. These positive and negative values offset each other resulting in a mean value around zero. In situations where this cancellation can occur, it is necessary to report the mean difference as a Root Mean Square (RMS). The root mean square statistic reports typical magnitudes of deviations without regard for positive or negative values.

By using a best-fit analysis type algorithm, the RMS mean deviation between the surfaces was calculated to be +/−0.236 mm, with over 95% of the data clearly falling within +/−0.5 mm.

A hazard analysis performed on the system of the invention demonstrates that, system 100 is safe. System 100 will not cause retinal blue-light or infrared eye injuries. Retinal thermal injury may only be caused if the infant is in the system 150,000 times longer than needed to capture the three-dimensional image.

One advantage of system 100 is that the image acquisition is fast enough so that motion of the infant does not present a problem for image capture, or affect the accuracy of the data acquired. If the image could not be captured 'instantaneously' it would be necessary to fixture or restrain the child in one position in order to ensure there would be no motion artifact in the data.

Capture of all 18 images (12 shape, 6 texture) is accomplished through utilization of an interface 103 in FIG. 1 that functions single frame grabber circuit board. At image capture time processor 105 generates a signal via interface 103 that is sent out to all cameras 102 to simultaneously record the digital images for processing. Each camera 102 records a digital image at a speed of $\frac{1}{125}^{th}$ of a second (0.008 seconds). This nearly instantaneous capture has allowed us to capture digitized images of infants in motion. The symmetrical placement of the cameras around the periphery also ensures that the child's specific orientation and position within the space 200 is not a factor.

Post-processing of intermediate images into a single digital model is done quickly so that the complete image can be reviewed before allowing the patient to leave the office. In an illustrative embodiment of the system the complete image may be produced in less than three minutes Once processed, the data may be viewed in a variety of formats that include point cloud, wire frame, surface, and texture. As the name implies, the image presented as a point cloud consists of hundreds of thousands of independent single points of data. A wire frame, sometimes referred to as a polygon or triangulated mesh, connects three individual data points into a single polygon with each data point being referred to as a vertex. A wire frame is the first step in viewing the individual data points as one continuous connected 'surface'. Once connected as a series of polygons, mathematical algorithms are applied to convert the faceted, polygonized surface into a smooth continuous surface upon which more complex measurements and mathematical analyses can be performed. While point cloud, wire frame and surface rendering are the most common methods for viewing digital data, it is also possible to obtain texture information which is seamlessly overlaid on the model. Texture data is overlaid onto the digital image to ensure proper patient identification.

The projection of a random infrared pattern by projectors 104, rather than the more a grid or line pattern, overcomes problems with interference and enables digital capture of the entire infant head or object 201 in a single shot. This includes a 360° image including the face, top of the head, and neck/occipital region all acquired within 0.008 seconds. System 100 is safe, impervious to motion, does not require the infant to be sedated or restrained, and images can be viewed within 2–3 minutes of acquisition. The data can be viewed in a wide variety of formats including point cloud, wire frame, surface and texture (photo) and can be exported to create physical models using stereo lithography or carved on a 5-axis milling machine. Quantitative data (linear and surface measurements, curvature, and volumes) can also be obtained directly from the digital data.

The three-dimensional images are stored in memory 111 of system 100 as shown in FIG. 1. A sequence of three-dimensional images may be captured and stored in memory 111 for later playback. The three-dimensional images may be sequentially displayed to produce a three-dimensional movie of the infant or object in motion. A particular feature is that since each three-dimensional image is taken of the entirety of the infant's head or object, the view of the image on playback may be changed to observe different portions of the infant's head or object as it moves. The view may be taken from any point on the exterior of the image capture space defined by the digital cameras.

The invention has been described in terms of various embodiments. It will be appreciated by those skilled in the art that various changes and modifications may be made to the embodiments without departing from the spirit or scope of the invention. It is not intended that the invention be limited to the embodiments shown and described. It is intended that the invention include all foreseeable modifications to the embodiments shown and described. It is intended that the invention be limited in scope only by the claims appended hereto.

What is claimed is:

1. A method for capturing three-dimensional images of objects, said method comprising:
    providing a plurality of image capturing device groups, each of said groups comprising at least one image-capturing device;
    positioning said plurality of image capturing device groups to define a space wherein an object may be disposed and the object being movable within said space;
    further positioning said plurality of image capturing device groups such that each group is positioned to capture a group of first images of a corresponding surface portion of the object disposed within said space, each said group of first images captured by the corresponding each of said image capturing groups capturing a substantially different surface portion of the object disposed within said space;
    operating said plurality of image capturing device groups to capture first images of the object in said space without constraining the object, such that a plurality of said groups of first images includes the entirety of the object within and including the top of said object;
    providing processing apparatus to process said plurality of said groups of first images to provide a three-dimensional image of the entirety of said object within said space.

2. A method in accordance with claim 1, comprising:
    simultaneously operating all of said image capturing devices of all of said image capturing device groups to capture a plurality of said groups of first images.

3. A method in accordance with claim 2, wherein:
    operating all of said image capturing devices at an image capture speed selected to be fast enough such that motion of said object has no significant effect on each of said first images.

4. A method in accordance with claim 3, wherein:
    said time period is short enough to provide a stop-action image capture.

5. A method in accordance with claim 4, comprising:
    utilizing said processing apparatus in accordance with a first algorithm to process each said group of first images to produce an intermediate three-dimensional image representation of said corresponding object portion;
    whereby said processing means processes all of plurality of groups of first images to produce a plurality of intermediate three-dimensional images, said plurality of three-dimensional images covering substantially the entirety of the object in said space.

6. A method in accordance with claim 5, comprising:
    providing a second algorithm;
    utilizing said processing apparatus in accordance with said second algorithm to process said plurality of intermediate three-dimensional images to produce a three-dimensional image of the object.

7. A method in accordance with claim 5, comprising:
    utilizing a CCD type camera for each of said image capturing devices.

8. A method in accordance with claim 7, comprising:
    providing one or more mounting structures to retain each imaging capture device of each group of said groups of image capturing devices in fixed predetermined positional relationship to the other of said image capturing devices in said group.

9. A method in accordance with claim 8, comprising:
    providing one or more positioning structures to retain each said group in a second predetermined positional relationship to the other groups of said groups of image capturing devices.

10. A method in accordance with claim 1, comprising:
    selecting the positions of said plurality of image capturing devices in accordance with a predetermined desired accuracy and a predetermined desired resolution in said three-dimensional image.

11. A method in accordance with claim 10, comprising:
    simultaneously operating all of said image capturing devices of all of said image capturing device groups to capture plurality of said groups of first images.

12. A method in accordance with claim 11, comprising:
    selecting the number of said image capturing devices in accordance with said predetermined accuracy and said predetermined desired resolution in said three-dimensional image.

13. A method in accordance with claim 12, comprising:
    operating all of said image capturing devices at an image capture speed selected to be fast enough such that motion of said object has no significant effect on each of said first images;
    whereby, said capture speed is fast enough to provide stop-action image capture of the object.

14. A method in accordance with claim 13, comprising:
    utilizing said processing apparatus in accordance with a first algorithm to process each said group of first images to produce an intermediate three-dimensional image representation of said corresponding object portion;
    whereby said processing apparatus processes all of plurality of groups of first images to produce a plurality of intermediate three-dimensional images, said plurality of three-dimensional images covering substantially the entirety of the object in said space.

15. A method in accordance with claim 14, comprising:
    providing a second algorithm;
    utilizing said processing apparatus in accordance with said second algorithm to process said plurality of intermediate three-dimensional images to produce a completed three-dimensional image of the portion of the object in said space.

16. A method in accordance with claim 13, comprising:
utilizing a CCD type camera for each of said image capturing devices.

17. A method in accordance with claim 16, comprising:
providing one or more mounting structures to retain each imaging capture device of each group of said groups of image capturing devices in fixed predetermined positional relationship to the other of said image capturing devices in said group.

18. A method in accordance with claim 17, comprising:
providing one or more positioning structures to retain each said group in a second predetermined positional relationship to the other groups of said groups of image capturing devices.

19. Apparatus for capturing three-dimensional images of a non-stationary object comprising:
a plurality of image capturing device groups, each of said groups comprising a plurality of image capturing devices;
said plurality of image capturing device groups positioned such that each group is positioned to capture a group of first images of a corresponding surface portion of a non-stationary object, each said group of first images captured by the corresponding each of said image capturing groups capturing a substantially different surface portion of the non-stationary object;
said plurality of image capturing device groups positioned such that a plurality of said groups of first images includes the entirety of the non-stationary object disposed within a predetermined space;
processing apparatus to process said plurality of said groups of first images to provide a three-dimensional image of the entirety of the non-stationary object portion; and
said processing apparatus operating all of said image capturing devices such that said first images are captured without restraining movement of the non-stationary object.

20. Apparatus in accordance with claim 19, comprising:
said processing apparatus simultaneously operates all of said image capturing devices of all of said image capturing device groups to capture plurality of said groups of first images.

21. Apparatus in accordance with claim 20, wherein:
each of said image capturing devices of all of said image capturing devices captures each of said first images in a time period that is short enough such that motion of the non-stationary object has no significant effect on each of said first images.

22. Apparatus in accordance with claim 21, wherein:
said time period is short enough to provide a stop-action image capture.

23. Apparatus in accordance with claim 22, comprising:
said processing apparatus operating in accordance with a first algorithm to process each said group of first images to produce an intermediate three-dimensional image representation of said corresponding non-stationary object portion; and
said processing apparatus being operated to processes all of plurality of groups of first images to produce a plurality of intermediate three-dimensional images, said plurality of three-dimensional images covering the entirety of the non-stationary object portion disposed in said pre-determined space.

24. Apparatus in accordance with claim 23, wherein:
each of said image capturing devices comprises a CCD type camera.

25. Apparatus in accordance with claim 24, comprising:
one or more mounting structures disposed to retain each imaging capture device of each group of said groups of image capturing devices in fixed predetermined positional relationship to the other of said image capturing devices in said group.

26. Apparatus in accordance with claim 25, comprising:
one or more positioning structures disposed to support and retain each said group in a second predetermined positional relationship to the other groups of said groups of image capturing devices.

27. Apparatus in accordance with claim 19, wherein:
said plurality of image capturing devices determines said predetermined space.

28. Apparatus in accordance with claim 27, comprising:
said processing apparatus being utilized to simultaneously operate all of said image capturing devices of all of said image capturing device groups to capture plurality of said groups of first images.

29. Apparatus in accordance with claim 28, wherein:
each of said image capturing devices of all of said image capturing devices captures each of said first images in a time period that is short enough such that motion of the object has no significant effect on each of said first images.

30. Apparatus in accordance with claim 29, wherein:
said time period is short enough to provide a stop-action image capture.

31. Apparatus in accordance with claim 30, comprising:
said processing apparatus being operated in accordance with a first algorithm to process each said group of first images to produce an intermediate three-dimensional digital image representation of said corresponding object portion;
said processing means processing all of plurality of groups of first images to produce a plurality of intermediate three-dimensional digital images, said plurality of three-dimensional digital images covering substantially the entirety of the object portion disposed within said predetermined space.

32. Apparatus in accordance with claim 31, wherein:
each of said image capturing devices comprises a CCD type camera.

33. Apparatus in accordance with claim 32, comprising:
one or more mounting structures to retain each imaging capture device of each group of said groups of image capturing devices in fixed predetermined positional relationship to the other of said image capturing devices in said group.

34. Apparatus in accordance with claim 33, comprising:
one or more positioning structures to retain each said group in a second predetermined positional relationship to the other groups of said groups of image capturing devices.

35. Apparatus in accordance with claim 31, comprising:
providing a second algorithm;
said processing apparatus being operated in accordance with said second algorithm to process said plurality of intermediate three-dimensional digital images to generate a three-dimensional digital images covering substantially the entirety of the object portion disposed within said predetermined space.

36. Apparatus in accordance with claim 31, comprising:
said processing apparatus being operated to generate a three-dimensional digital image covering substantially the entirety of the object portion disposed within said predetermined space.

37. Apparatus for capturing three-dimensional images of an object, comprising:

a plurality of image capturing device groups, each of said groups comprising a plurality of digital cameras;

said plurality of image capturing device groups being positioned to define an image capturing space, said plurality of image capturing device groups being positioned to capture a group of first digital images of a corresponding surface portion of an non-stationary object disposed in said space and movable within said space, each said group of first digital images captured by the corresponding each of said image capturing groups capturing a substantially different surface portion of said non-stationary object;

said plurality of image capturing device groups being positioned such that a plurality of said groups of first digital images includes the entirety of said non-stationary object in said space;

a plurality of pattern projectors, each of said pattern projectors being associated with at least a corresponding one of said image capturing device groups for projecting a predetermined pattern on said non-stationary object disposed in said space;

processing apparatus to process said plurality of said groups of first digital images to provide a three-dimensional image of the entirety of said non-stationary object disposed within said space.

38. Apparatus in accordance with claim 37, comprising:
said processing apparatus simultaneously operating all of said digital cameras of all of said image capturing device groups and all of said pattern projectors to capture a plurality of said groups of first digital images.

39. Apparatus in accordance with claim 38, wherein:
each of said digital cameras is operable to capture corresponding ones each of said first digital images in a time period that is short enough such that motion of said object in said space has no significant effect on each of said first images.

40. Apparatus in accordance with claim 39, wherein:
said time period is short enough to provide a stop-action image capture of said object.

41. Apparatus in accordance with claim 40, comprising:
said processing apparatus being operated in accordance with a first algorithm to process each said group of first digital images to produce an intermediate three-dimensional digital image representation of said corresponding object portion;

whereby said processing apparatus operates to processes all of plurality of groups of first images to produce a plurality of intermediate three-dimensional digital images, said plurality of three-dimensional digital images covering substantially the entirety of the portion of the object disposed in said space.

42. Apparatus in accordance with claim 41, wherein:
said digital cameras comprises a CCD type camera.

43. Apparatus in accordance with claim 42, comprising:
one or more mounting structures retaining each digital camera of each group of said groups of image capturing devices in fixed predetermined positional relationship to the other of said image capturing devices in said group.

44. Apparatus in accordance with claim 43, comprising:
one or more positioning structures retaining each said group in a second predetermined positional relationship to the other groups of said groups of image capturing devices.

* * * * *